US012686928B2

(12) United States Patent
Litton et al.

(10) Patent No.: US 12,686,928 B2
(45) Date of Patent: Jul. 21, 2026

(54) MACHINABLE COATING WITH ENVIRONMENTAL BARRIER PROPERTIES

(71) Applicant: RAYTHEON TECHNOLOGIES CORPORATION, Farmington, CT (US)

(72) Inventors: David A. Litton, West Hartford, CT (US); Ahmed Abdillahi Abdi, Oceanside, CA (US)

(73) Assignee: RTX Corporation, Farmington, CT (US)

( * ) Notice: Subject to any disclaimer, the term of this patent is extended or adjusted under 35 U.S.C. 154(b) by 88 days.

(21) Appl. No.: 18/131,696

(22) Filed: Apr. 6, 2023

(65) Prior Publication Data

US 2024/0337025 A1 Oct. 10, 2024

(51) Int. Cl.
*C23C 28/04* (2006.01)
*F01D 5/28* (2006.01)

(52) U.S. Cl.
CPC ............ *C23C 28/042* (2013.01); *F01D 5/288* (2013.01); *F05D 2230/90* (2013.01); *F05D 2300/611* (2013.01)

(58) Field of Classification Search
None
See application file for complete search history.

(56) References Cited

U.S. PATENT DOCUMENTS

| | | | |
|---|---|---|---|
| 2,667,327 | A | 1/1954 | Hardigg |
| 4,820,126 | A | 4/1989 | Gavilan |
| 5,439,348 | A | 8/1995 | Hughes et al. |
| 6,418,618 | B1 | 7/2002 | Burdgick |
| 7,666,515 | B2 | 2/2010 | Nagaraj et al. |
| 7,963,745 | B1 | 6/2011 | Liang |
| 9,777,583 | B2 | 10/2017 | Leggett et al. |
| 10,024,175 | B2 | 7/2018 | Varney |
| 10,401,028 | B2 | 9/2019 | Freeman et al. |
| 10,415,402 | B2 | 9/2019 | Murdock et al. |
| 10,458,653 | B2 | 10/2019 | Freeman et al. |
| 10,465,534 | B2 | 11/2019 | Freeman et al. |
| 10,472,976 | B2 | 11/2019 | Freeman et al. |
| 10,760,435 | B2 | 9/2020 | Dawson et al. |
| 10,934,873 | B2 | 3/2021 | Sarawate et al. |
| 11,143,040 | B2 | 10/2021 | McCaffrey et al. |
| 11,466,585 | B2 | 10/2022 | Arbona et al. |
| 2013/0017059 | A1 | 1/2013 | Wu et al. |

(Continued)

FOREIGN PATENT DOCUMENTS

| | | | |
|---|---|---|---|
| EP | 3904314 | A1 | 11/2021 |
| EP | 4276285 | A1 | 11/2023 |

(Continued)

OTHER PUBLICATIONS

European Search Report for EP Application No. 24165318.7 dated Aug. 30, 2024.

*Primary Examiner* — Shamim Ahmed
*Assistant Examiner* — Bradford M Gates
(74) *Attorney, Agent, or Firm* — Carlson, Gaskey & Olds, P.C.

(57) ABSTRACT

An article includes a barrier layer disposed on a bond coat. The barrier layer includes diffusive particles and gettering particles disposed in a matrix. The article also includes a machinable coating disposed on the barrier layer. A method of applying a coating to an article is also disclosed.

13 Claims, 2 Drawing Sheets

(56) References Cited

U.S. PATENT DOCUMENTS

| | | | |
|---|---|---|---|
| 2015/0050158 | A1 | 2/2015 | Thomas et al. |
| 2015/0369133 | A1* | 12/2015 | Bogue ..................... C23C 24/04 251/12 |
| 2016/0332922 | A1 | 11/2016 | Tang et al. |
| 2017/0058686 | A1 | 3/2017 | Bancheri et al. |
| 2017/0218768 | A1 | 8/2017 | Boeck |
| 2017/0305797 | A1* | 10/2017 | Nasiri ............... C04B 35/62222 |
| 2019/0368065 | A1* | 12/2019 | Cao ........................ C25D 21/14 |
| 2020/0095666 | A1* | 3/2020 | Schmid ................. C23C 28/321 |
| 2020/0141276 | A1 | 5/2020 | Wolfe et al. |
| 2021/0189904 | A1* | 6/2021 | Kracum .................. F01D 25/08 |
| 2022/0169574 | A1 | 6/2022 | Shim et al. |

FOREIGN PATENT DOCUMENTS

| | | |
|---|---|---|
| JP | H1130103 | 2/1999 |
| WO | 2022/026115 A1 | 2/2022 |

* cited by examiner

MACHINABLE COATING WITH ENVIRONMENTAL BARRIER PROPERTIES

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors, and the turbine section includes low and high pressure turbines.

This disclosure relates to composite articles, such as those used in gas turbine engines. Components, such as gas turbine engine components, may be subjected to high temperatures, corrosive and oxidative conditions, and elevated stress levels. In order to improve the thermal and/or oxidative stability, the component may include a protective barrier coating.

SUMMARY

An article according to an exemplary embodiment of this disclosure, among other possible things includes a barrier layer disposed on a bond coat. The barrier layer includes diffusive particles and gettering particles disposed in a matrix. The article also includes a machinable coating disposed on the barrier layer.

In a further example of the foregoing, the machinable coating includes at least one of rare earth silicates, alkaline earth silicates, alkaline earth aluminosilicates, yttria-stabilized zirconia, alumina-stabilized zirconia, mullite, titania, chromia, silicon, silicon oxides, silicon carbides, silicon oxycarbides, barium magnesium aluminosilicate, hafnium oxides, hafnium silicon oxides, alumina stabilized zirconia, zirconium oxides, yttrium oxides, and combinations thereof.

In a further example of any of the foregoing, the machinable coating includes at least one of hafnon, zircon, and mullite.

In a further example of any of the foregoing, the matrix is silica.

In a further example of any of the foregoing, the article also includes a topcoat disposed between the barrier layer and the machinable coating.

In a further example of any of the foregoing, a surface roughness of the machinable coating is between about 20 and about 100 microinches Ra.

In a further example of any of the foregoing, the surface roughness of the machinable coating is between about 25 and about 65 microinches Ra.

In a further example of any of the foregoing, the diffusive particles are BMAS.

In a further example of any of the foregoing, the gettering particles are SiOC or SiC.

In a further example of any of the foregoing, the article includes a slot. The barrier layer and machinable coating are disposed on at least one surface of the slot.

A method of applying a coating to an article according to an exemplary embodiment of this disclosure, among other possible things includes applying a barrier layer to an article. The barrier layer includes diffusive particles and gettering particles disposed in a matrix. The method also includes applying a machinable coating on the barrier layer and machining the machinable coating.

In a further example of the foregoing, the machining is by at least one of grinding, ultrasonic machining, water guided laser, milling, reaming.

In a further example of any of the foregoing, the machinable coating includes at least one of rare earth silicates, alkaline earth silicates, alkaline earth aluminosilicates, yttria-stabilized zirconia, alumina-stabilized zirconia, mullite, titania, chromia, silicon, silicon oxides, silicon carbides, silicon oxycarbides, barium magnesium aluminosilicate, hafnium oxides, hafnium silicon oxides, alumina stabilized zirconia, zirconium oxides, yttrium oxides, and combinations thereof.

In a further example of any of the foregoing, the matrix is silica.

In a further example of any of the foregoing, the diffusive particles are BMAS and wherein the gettering particles are SiOC or SiC.

In a further example of any of the foregoing, a surface roughness of the machinable coating is about 350 microinches Ra before the machining.

In a further example of any of the foregoing, a surface roughness of the machinable coating is between about 20 and about 100 microinches Ra after the machining.

In a further example of any of the foregoing, a surface roughness of the machinable coating is between about 25 and about 65 microinches Ra after the machining.

In a further example of any of the foregoing, the method also includes applying a topcoat to the barrier layer before applying the machinable coating.

In a further example of any of the foregoing, the article includes a slot. The barrier layer and machinable coating are applied to at least one surface of the slot.

DETAILED DESCRIPTION

Figure 1:
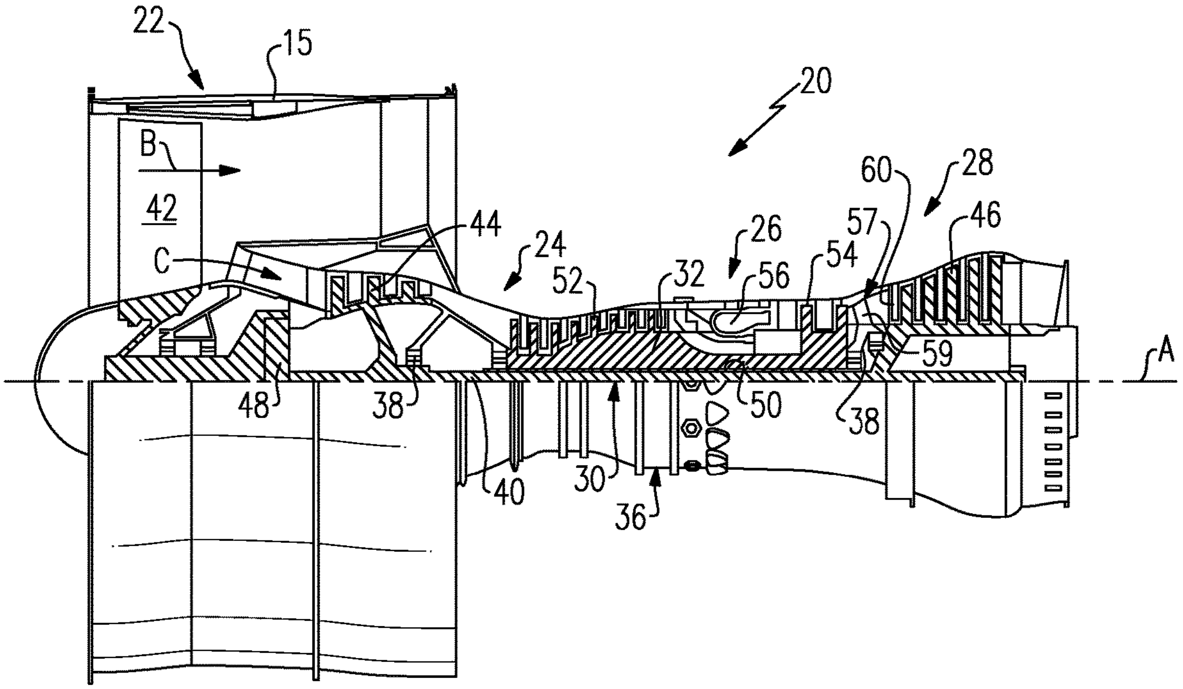
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans. A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as “bucket cruise Thrust Specific Fuel Consumption (‘TSFC’)”—is the industry standard parameter of 1 bm of fuel being burned divided by 1 bf of thrust the engine produces at that minimum point. “Low fan pressure ratio” is the pressure ratio across the fan blade alone, without a Fan Exit Guide Vane (“FEGV”) system. The low fan pressure ratio as disclosed herein according to one non-limiting embodiment is less than about 1.45. “Low corrected fan tip speed” is the actual fan tip speed in ft/sec divided by an industry standard temperature correction of [(Tram °R)/(518.7°R)]0.5. The “Low corrected fan tip speed” as disclosed herein according to one non-limiting embodiment is less than about 1150 ft/second (350.5 meters/second).

The example gas turbine engine includes the fan section 22 that comprises in one non-limiting embodiment less than about 26 fan blades 42. In another non-limiting embodiment, the fan section 22 includes less than about 20 fan blades 42. Moreover, in one disclosed embodiment the low pressure turbine 46 includes no more than about 6 turbine rotors. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors in the low pressure turbine 46 and the number of blades 42 in the fan section 22 disclose an example gas turbine engine 20 with increased power transfer efficiency.

Figure 2:
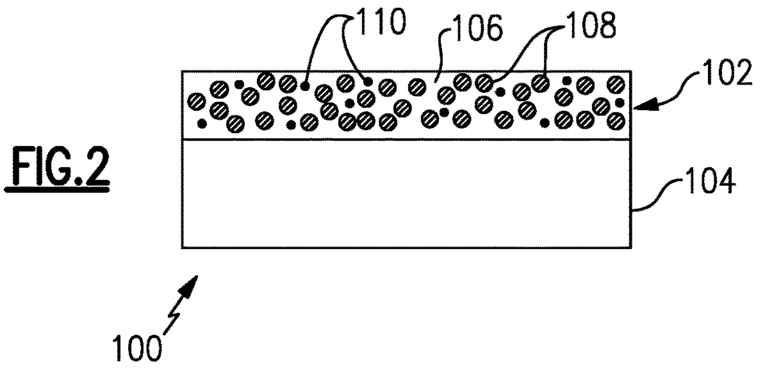
FIG. 2 illustrates an example article having a barrier layer.

FIG. 2 schematically illustrates a representative portion of an example article 100 for the gas turbine engine 20 that includes a composite material that is used as a barrier layer 102. The article 100 can be, for example, an airfoil in the compressor section 24 or turbine section 28, a combustor liner panel in the combustor section 26, a blade outer air seal, or other component that would benefit from the examples herein. In this example, the composite material 102 is used as an environmental barrier layer to protect an underlying substrate 104 from environmental conditions, as well as thermal conditions. As will be appreciated, the composite material 102 can be used as a stand-alone barrier layer, as an outermost/top coat with additional underlying layers, or in combination with other coating under- or over-layers, such as, but not limited to, ceramic-based topcoats.

The composite material forms a barrier layer 102. The composite material includes a matrix 106, a dispersion of “gettering” particles, and a dispersion of diffusive particles. In one example, the gettering particles are silicon carbide particles (SiC) or silicon oxycarbide particles (SiOC) 108 and the diffusive particles are barium-magnesium alumino-silicate particles 110 (“BMAS particles 110”), though other examples are contemplated. The gettering particles 108 may form a network within the matrix. By “dispersion” this application means the gettering particles and the diffusive particles are all intermixed in a single layer as illustrated.

In one example, the matrix 106 is silica ($SiO_2$).

In one example, the composite material 102 includes, by volume, 1-30% of the diffusive particles 110. In a more particular example, the composite material 102 includes, by volume, 1-10% of diffusive particles 110. In a further example, the composite material 102 includes, by volume, 30-94% of the gettering particles 108. In a particular example, the composite material includes, by volume, 60-90% of the gettering particles 108. In one further example, the composite material 102 includes, by volume, 5-40% of the matrix 26 of silicon dioxide. In a further example, the composite material 102 includes, by volume, 1-30% of the diffusive particles 110, 5-40% of the matrix 106 of silicon dioxide, and a balance of the gettering particles 108.

The barrier layer protects the underlying substrate 104 from oxygen and moisture. For example, the substrate 104 can be a ceramic-based substrate, such as a silicon-containing ceramic material. One example is silicon carbide. The gettering particles 108 and the diffusive particles 110 of the barrier layer function as an oxygen and moisture diffusion barrier to limit the exposure of the underlying substrate 104 to oxygen and/or moisture from the surrounding environment. Without being bound by any particular theory, the diffusive particles 110 enhance oxidation and moisture protection by diffusing to the outer surface of the barrier layer opposite of the substrate 104 and forming a sealing layer that seals the underlying substrate 104 from oxygen/moisture exposure. Additionally, the cationic metal species of the diffusive particles 110 (barium, magnesium, and aluminum) can diffuse into the gettering particles 108 to enhance oxidation stability of the silicon oxycarbide material. Further, the diffusion behavior of the diffusive particles 110 may operate to seal any microcracks that could form in the barrier layer. Sealing the micro-cracks could prevent oxygen from infiltrating the barrier layer, which further enhances the oxidation resistance of the barrier layer. The gettering particles 108 can react with oxidant particles, such as oxygen or water, that could diffuse into the barrier layer. In this way, the gettering particles 108 could reduce the likelihood of those oxidant particles reaching and oxidizing the substrate 104.

Figure 3:
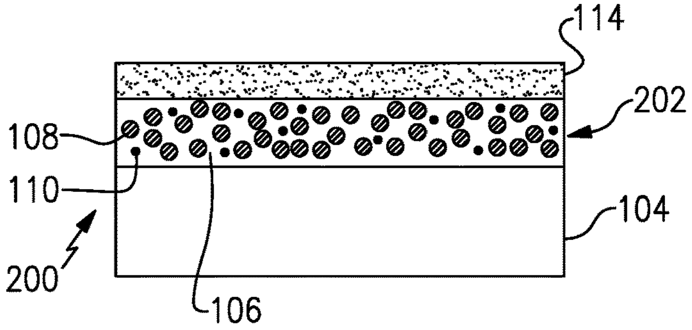
FIG. 3 schematically illustrates another example article having a barrier layer.

The barrier layer 102 may be applied to the article 100 by any known method, such as slurry coating or plasma spray. The application may include heat treatment or curing steps as appropriate for the application method and material selected for the barrier layer 102. FIG. 3 shows another example article 200. In this example, a barrier layer 202 is disposed on the article 100 and like the example in FIG. 2 includes gettering particles 108 and diffusive particles 110 dispersed in a matrix 106. The matrix 106 can be or include any of the materials discussed above for matrix 106, but in a particular example is silica.

A machinable coating 114 is disposed on the barrier layer 102. The machinable coating 114 is "machinable" in that it can be subject to grinding, ultrasonic machining such as ultrasonic impact grinding, water guided laser, milling, reaming, or another machining method to reduce it thickness and/or smooth its surface without any negative effects to its integrity. Smoothing the surface of the machinable coating 114 ultimately improves the aerodynamic performance of the article 110.

The machinable coating 114 may be or include rare earth silicates, alkaline earth silicates, alkaline earth aluminosilicates, yttria-stabilized zirconia, alumina-stabilized zirconia, mullite, titania, chromia, silicon, silicon oxides, silicon carbides, silicon oxycarbides, barium magnesium aluminosilicate, hafnium oxides such as hafnon, hafnium silicon oxides, alumina stabilized zirconia, zirconium oxides such as zircon, yttrium oxides such as yttria, mullite, and combinations thereof. In a particular example, the machinable coating 114 includes at least one of hafnon, zircon, and mullite.

The barrier layer 202 is applied to the article 200 by any known method, such as slurry coating or plasma spray. The machinable coating 114 is then disposed on the barrier layer 202 also by any known method such as slurry coating or plasma spray. In one example, the machinable coating 114 has a surface roughness of about 350 microinches Ra (arithmetic average roughness) after being applied. After application of the machinable coating 114, the machinable coating 114 is machined by, for instance, grinding, ultrasonic machining such as ultrasonic impact grinding, water guided laser, milling, reaming, or another machining method. The machining smooths the outer surface of the machinable coating 114 which as discussed above improves the aerodynamic performance of the article 100. After the machining, the machinable coating 114 has a smoother surface than an outer surface of the barrier layer 202 on which the machinable coating 114 is disposed. In a particular example, the machinable coating 114 has a surface roughness between about 20 and about 100 microinch Ra after machining. In a further example, the machinable coating 114 has a surface roughness between about 25 and about 65 Ra after machining.

Figure 4:
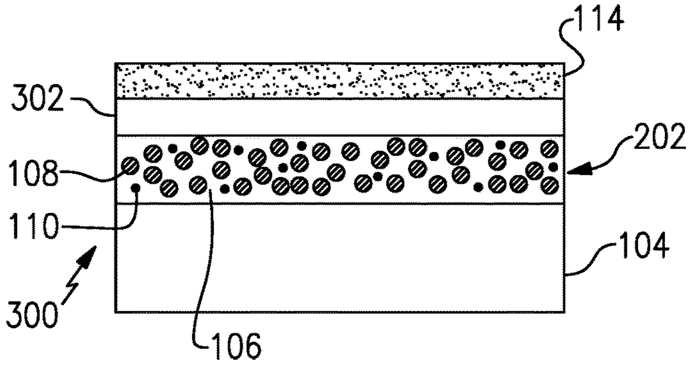
FIG. 4 schematically illustrates another example article having a barrier layer.

Topcoats or additional coating layers known in the art can be used with either of the above barrier layers 102/202. For example, an example article 300 shown in FIG. 4 includes a topcoat 302 disposed between the barrier layer 102 and machinable coating 114. The topcoat 302 may be a ceramic-based topcoat and can include one or more layers of an oxide-based material. The oxide-based material can be, for instance, hafnium-based oxides, yttrium-based oxides (such as hafnia, hafnium silicate, yttrium silicate, yttria stabilized zirconia or gadolinia stabilized zirconia), or combinations thereof, but is not limited to such oxides.

Figure 5:
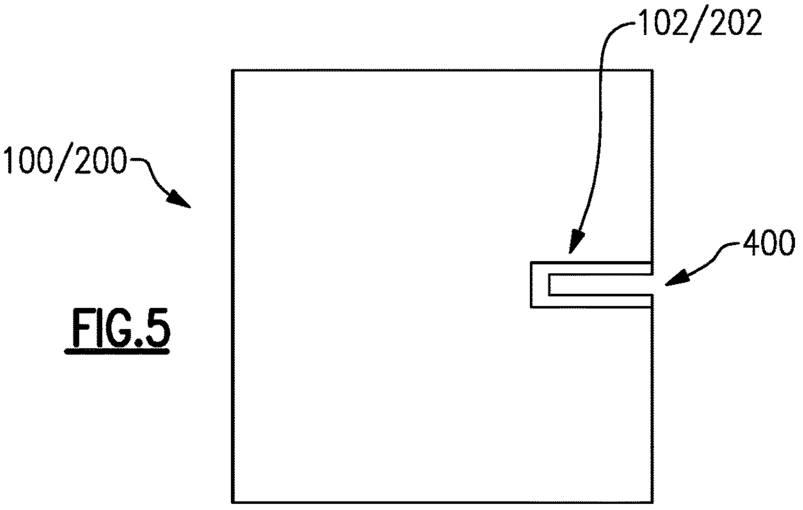
FIG. 5 schematically illustrates another example article having a slot.

In a particular example, the article 100/200 includes at least one slot 400, and the barrier layer 102/202 is disposed on at least one surface of the slot 400 as schematically shown in FIG. 5. It should be understood that the article 100/200 in FIG. 5 can include the machinable coating 114 or topcoat 302 as discussed above and shown in FIG. 4.

As used herein, the term "about" has the typical meaning in the art, however in a particular example "about" can mean deviations of up to 10% of the values described herein.

Although the different examples are illustrated as having specific components, the examples of this disclosure are not limited to those particular combinations. It is possible to use some of the components or features from any of the embodiments in combination with features or components from any of the other embodiments.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An article, comprising:

a ceramic based substrate, a bond coat on the substrate;

a barrier layer disposed on the bond coat, the barrier layer including diffusive particles and gettering particles disposed in a matrix, and there being a dispersion of the diffusive particles and the gettering particles within the same layer of matrix;

a machinable coating disposed on the barrier layer;

wherein a surface roughness of the machinable coating is between about 20 and about 100 microinches Ra; and wherein the article includes a slot, and wherein the barrier layer and machinable coating are disposed on at least one surface of the slot; and wherein the machinable coating is mullite.

2. The article of claim 1, wherein the matrix is silica.

3. The article of claim 1, further comprising a topcoat disposed between the barrier layer and the machinable coating.

4. The article of claim 1, wherein the surface roughness of the machinable coating is between about 25 and about 65 microinches Ra.

5. The article of claim 1, wherein the diffusive particles are barium-magnesium alumino-silicate.

6. The article of claim 1, wherein the gettering particles are SiOC or SiC.

7. A method of applying a coating to an article, comprising:

applying a barrier layer to a ceramic based article, the barrier layer including diffusive particles and gettering particles disposed in a matrix, and there being a dispersion of the diffusive particles and the gettering particles within the same layer of matrix;

applying a machinable coating of mullite on the barrier layer;

machining the machinable coating;

wherein a surface roughness of the machinable coating is between about 20 and about 100 microinches Ra after the machining; and wherein the article includes a slot, and wherein the barrier layer and machinable coating are applied to at least one surface of the slot.

8. The method of claim 7, wherein the machining is by at least one of grinding, ultrasonic machining, water guided laser, milling and reaming.

9. The method of claim 7, wherein the matrix is silica.

10. The method of claim 7, wherein the diffusive particles are barium-magnesium alumino-silicate and wherein the gettering particles are SiOC or SiC.

11. The method of claim 7, wherein a surface roughness of the machinable coating is about 350 microinches Ra before the machining.

12. The method of claim 7, wherein a surface roughness of the machinable coating is between about 25 and about 65 microinches Ra after the machining.

13. The method of claim 7, further comprising applying a topcoat to the barrier layer before applying the machinable coating.

* * * * *